United States Patent [19]
Oda et al.

[11] Patent Number: 5,516,205
[45] Date of Patent: May 14, 1996

[54] TWIN EXTRUDER

[75] Inventors: Norimasa Oda; Minoru Yoshida; Hideki Mizuguchi; Katsumi Sumioda, all of Hiroshima, Japan

[73] Assignee: The Japan Steel Works, Ltd., Tokyo, Japan

[21] Appl. No.: 371,864

[22] Filed: Jan. 12, 1995

[30] Foreign Application Priority Data

Jan. 12, 1994 [JP] Japan ................................. 6-001748

[51] Int. Cl.⁶ ......................................... B28C 5/08
[52] U.S. Cl. ........................... 366/75; 306/85; 306/300; 306/301
[58] Field of Search .................. 366/75, 77, 83, 366/84, 85, 86, 97, 297, 298, 299, 300, 301; 425/203, 204, 205, 207, 208, 209, 200

[56] References Cited

U.S. PATENT DOCUMENTS

| | | | |
|---|---|---|---|
| 4,107,787 | 8/1978 | Ocker | 366/75 |
| 4,763,569 | 8/1988 | Wenger | 366/75 |
| 4,983,114 | 1/1991 | Hauck | 366/85 |

*Primary Examiner*—Robert W. Jenkins
*Attorney, Agent, or Firm*—Sughrue, Mion, Zinn, Macpeak & Seas

[57] ABSTRACT

A twin extruder has a material supplying section, a conveying section, a kneading section, a degassing section, and a discharging section. In the conveying section and the kneading section, a plurality of grooves are formed in each of two walls arcuate in cross section of a cylinder which define an internal hole in the cylinder, and/or a cut is formed at each of the junctions of the walls of the cylinder.

15 Claims, 4 Drawing Sheets

TWIN EXTRUDER

BACKGROUND OF THE INVENTION

1. Field of the Invention

This invention relates to twin extruders, and more particularly to increasing the processing capacity of a twin extruder which melts and kneads powdery resin material, or a mixture of powdery or granular resin and powdery material.

2. Related Art

A conventional twin extruder has a material supplying section, a conveying section, a kneading section, a degassing section, and a discharging section with two screws rotatably engaged with each other in the internal hole of a cylinder, In the twin extruder, resin material is supplied through the material supplying inlet of the material supplying section into the cylinder under the condition that the temperature of the cylinder is externally controlled to a predetermined value and the screws are kept turned in the cylinder. The resin material thus supplied is molten by the heat of the cylinder and by the friction of the resin materials which is produced by the kneading action of the screws in the cylinder while passing through the conveying section, and then kneaded at the kneading section, and then moved to the degassing section, where gas such as volatile gas is removed from the resin materials. The resin material thus processed is moved to the discharging section, where it is subjected to discharging pressure, so that it is pushed out of the cylinder.

If more than several tens of percent of the material to be kneaded is powdery material 10 microns or less in average grain size, or the material to be kneaded is all powdery material 10 microns or less in average grain size, then gas (air) held in the powdery material (by the particles) is not readily separated therefrom.

In an ordinary twin extruder, a material to be kneaded (hereinafter referred to as "a kneading material", when applicable) is conveyed and molten while holding gas. Hence, the gas held in the kneading material caught between the wall of the internal hole of the cylinder and the grooves of the screws, is expanded as the temperature of the kneading material increases, thus forming cavities in the kneading material being held therein. It is difficult for the gas to flow towards the downstream end of the cylinder because the downstream end portion of the cylinder is filled with the kneading material which has been molten. Hence, the gas thus held is caused to intermittently or instantaneously flow back towards the material supplying section where the gas can relatively readily flow because the kneading material therein is deformable because it is not molten yet.

As a result, the amount of supply of the kneading material changes unstably, and therefore it becomes difficult for the twin extruder to perform its operation stably. That is, the extruder is lowered in the capacity of processing a kneading material. And it is difficult to increase the processing capacity and the processing efficiency of the extruder.

With respect to the discharging of gas from a kneading material, Unexamined Japanese Utility Patent Publication No. 17321/1990, 76023/1990 and 90732/1982 have proposed the following twin extruders:

In case of the twin extruder disclosed by the Unexamined Japanese Utility Patent Publication No. 17321/1990, in the material supplying section and the conveying section, the internal hole of the cylinder is polygonal in cross section.

In the extruder, a kneading material conveyed through the material supplying section to the conveying section is heated, compressed, and molten. During this operation, the gas is separated from the kneading material, and is moved back into the material supplying section through the gaps between the wall of the cylinder's internal hole polygonal in cross section and the outer rotational peripheries of the screws. The gas thus moved back is discharged through the material supplying inlet out of the cylinder.

In case of the twin extruder of the Unexamined Japanese Utility Model Publication No. 76023/1990, in the material supplying section and the conveying section, a porous member is used to provide the internal hole for the cylinder in such a manner that a gas discharging space is formed between the outer surface of the porous member and the cylinder.

In the material supplying section and the conveying section, the gas separated from the kneading material passes through the pores of the porous member, thus being discharged through the gas discharging space out of the cylinder similarly as in the above-described case.

In the case of the twin extruder of the Japanese Utility Model Publication No. 90731/1982, in the material supplying section and the conveying section the internal hole of the cylinder has a groove in its upper wall which is extended axially, and a gas discharging vent hole is provided at the end of the groove, just behind the material supplying inlet of the material supplying section.

Similarly as in the above-described cases, in the material supplying section and the conveying section the gas separated from the kneading material passes through the groove and is then discharged through the vent hole out of the cylinder.

In almost all the conventional twin extruders proposed in the art including the above-described conventional ones, a gas flow path is formed which allows the gas separated from the kneading material to flow back towards the material supplying section, so that the gas is continuously and smoothly discharged out of the cylinder. This contributes to improvement of the twin extruder in safety operation and in processing capacity.

However, it should be noted that the flow path formed inside the cylinder is a part of the cylinder's internal hole, and the gas flowing back along the flow path is moved while contacting part of the kneading material, so that it flows back while drawing the powdery material; that is, the gas is moved together with the powdery material thus drawn.

Hence, the gas discharging section adapted to discharge the gas thus separated needs means for removing and receiving the powdery material from the gas.

In the conveying section, the kneading material is molten; that is, its phase is changed from solid phase to liquid phase.

The kneading material of solid phase is high in fluidity. Hence, the kneading material of powdery and granular particles will fill the grooves formed in the cylinder's internal hole with ease. In addition, particularly in the case where the kneading material is organic powdery material, the kneading material, being brought into contact with the cylinder heated, is partially molten and stuck to the grooves, thus gradually filling the grooves, which may block the flow of the gas.

On the other hand, whether the kneading material is powdery or granular or no matter how it is molten, the kneading material is liable to be settled at the corners of the cylinder's internal hole which correspond to the vertexes of the polygonal cross-section of the latter, or the bottoms of the grooves which are formed in the cylinder's internal hole in such a manner that they are extended axially. The kneading material thus settled may be stuck there.

In the case where, in the material supplying section and the conveying section, the internal hole of the cylinder is made of the porous material, the pores of the porous material may be gradually clogged up with the powdery material. In this case, it may become impossible to discharge the gas separated from the kneading material.

SUMMARY OF THE INVENTION

Accordingly, an object of the invention is to eliminate the above-described difficulties accompanying a conventional twin extruder. More specifically, an object of the invention is to provide a twin extruder improved in processing capacity which is able to stably discharge from the cylinder the gas held in the kneading material.

Provided according to the invention is a twin extruder which has a material supplying section, a conveying section, a kneading section, a degassing section, and a discharging section with two screws rotatably engaged with each other in the internal hole of a cylinder; in which, a plurality of grooves are formed in two walls arcuate in cross section of the cylinder which defines the internal hole in such a manner that the grooves are continuously extended axially.

In the twin extruder, the distance between each of the grooves and the outer rotational periphery of the respective one of the screws is gradually decreased in the direction of rotation thereof.

Furthermore, provided according to the invention is a twin extruder which has a material supplying section, a conveying section, a kneading section, a degassing section, and a discharging section with two screws engaged with each other in the internal hole of a cylinder in such a manner that the two screws are rotatable in the same direction; in which cuts are formed at the junctions of two walls arcuate in cross section of the cylinder which defines the internal hole in the conveying section and the kneading section.

In the twin extruder, the distance between each of the cuts and the outer rotational periphery of the respective one of the screws is gradually decreased in the direction of rotation thereof.

Moreover in the twin extruder, a plurality of grooves are formed in the two walls arcuate in cross section of the cylinder in the conveying section and the kneading section in such a manner that they are continuously extended axially.

In the twin extruder, a kneading material which is a mixture of powdery materials is supplied into the cylinder through the material supplying illlet of the material supplying section. The kneading material thus supplied is moved from the material supplying section through the conveying section, the kneading section and the degassing section to the discharging section by the screws while being turned along the two walls arcuate in cross section of the cylinder which defines the internal hole.

In this operation, the kneading material is molten and kneaded, and the gas is separated from the kneading material and discharged from the cylinder through the gas discharging outlet of the degassing section. Thus, the molten resin uniformly kneaded is discharged from the discharging section; i.e., from the downstream end of the cylinder.

A molten resin which is great in viscosity when molten is relatively low in the speed of deformation. Therefore, in the case where the flow path increases in sectional area abruptly in the direction of flow of the molten resin, the molten resin cannot immediately follow the increase of the sectional area, so that a space is formed where the increase of the sectional area starts.

The grooves formed in the two walls arcuate in cross section of the cylinder which define the internal hole provide an abrupt increase in the cross-sectional area of the flow path for the molten resin flowing along the two arcuate parts, so that the above-described spaces are formed in the grooves in such a manner that they are extended axially in the conveying section and the kneading section.

The gas separated from the kneading material in the conveying section and the kneading section is allowed to flow through the above-described axially extended spaces formed in the grooves in the conveying section and the kneading section to the low pressure degassing section, where it is discharged from the cylinder through the gas discharging outlet.

Each of the grooves is smoothly curved in section in such a manner that its depth is abruptly increased and then gradually decreased in the direction of rotation of the respective screw. This means that the cross-sectional area of the flow path is effectively changed. In addition, the kneading material tending to settle in the groove is readily drawn into the space between the cylinder's internal hole and the screw by the high-viscous coagulation which the kneading material shows when molten.

Each of the cuts formed at the junctions of the two walls arcuate in cross section of the cylinder in which the two screws are turned in the same direction, abruptly increases the cross-sectional area of the flow path for the molten resin flowing along the two walls of the cylinder, so that a space is formed along the cut in such a manner that it is extended axially in the conveying section and the kneading section.

The gas separated from the kneading material in the conveying section and the kneading section is allowed to flow through the spaces formed along the cuts to the low pressure degassing section, where it is discharged from the cylinder through the gas discharging outlet.

Each of the cuts is so shaped that its distance from the outer rotational periphery of the respective screw is gradually decreased in the direction of rotation of the screw; in other words, each cut is so shaped that the distance between the bottom of the cut and the outer rotational periphery of the screw is gradually decreased which is turned along the wall arcuate in cross section while approaching the junction of the arcuate parts from the space in the internal hole. Hence, when the other screw turning in the same direction along the wall arcuate in cross section, goes into the space in the internal hole at the cut, the change in sectional area of the flow path is effective.

Since the cut is gradually decreased in depth in the direction of rotation of the screw, the kneading material tending to settle at the cut is readily drawn into the space between the cylinder's internal hole and the screw by the high-viscous coagulation which the kneading material shows when molten.

The grooves formed in the two walls arcuate in cross section of the cylinder which defines the internal hole of the cylinder in which two screws are turned in the same direction, and the cuts formed at the junctions of the two wall, increase the sectional area of the flow path abruptly for the molten resin flowing along the two walls of the cylinder, functioning in the above-described manners.

DETAILED DESCRIPTION OF PREFERRED EMBODIMENTS

Examples of a twin extruder, which constitutes preferred embodiments of the invention, will be described with reference to the accompanying drawings.

Figure 1:
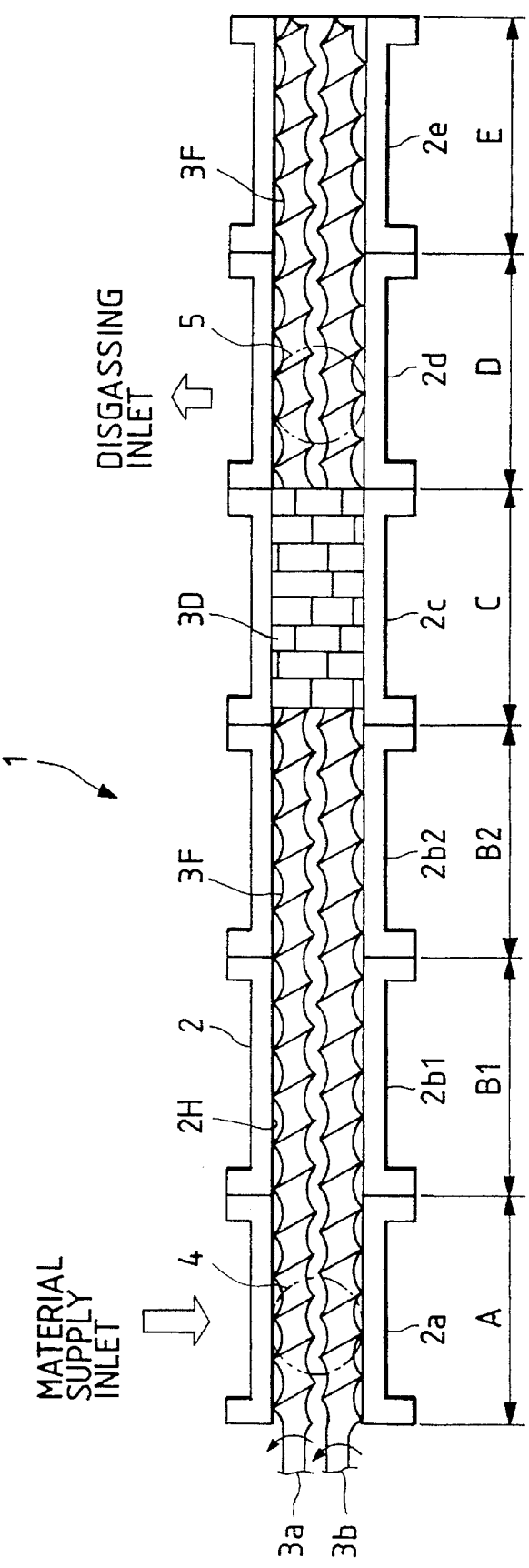
FIG. 1 is a diagram (or sectional plan view) showing the arrangement of a twin extruder according to the invention.
Figure 6:
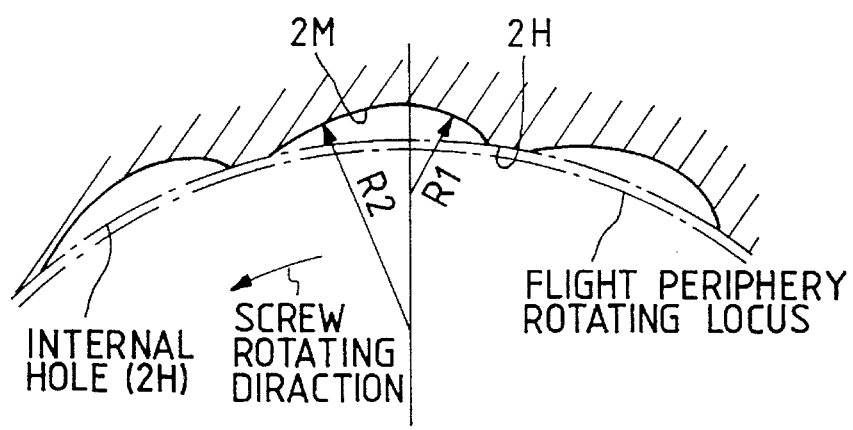
FIG. 6 is a sectional diagram for a description of the configuration of the grooves formed in the cylinder of the twin extruder according to the invention.
Figure 7:
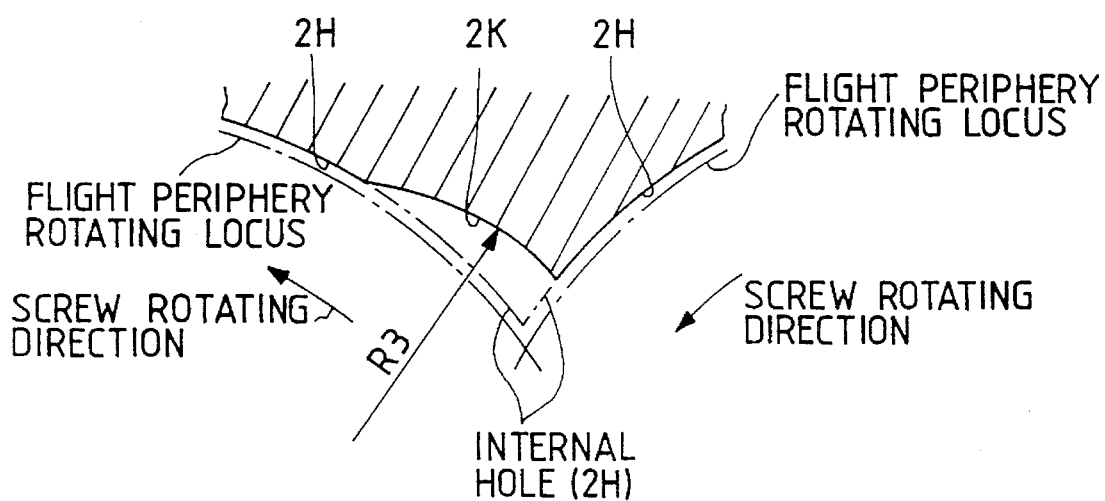
FIG. 7 is a sectional diagram for a description of the configuration of the cuts formed in the cylinder of the twin extruder according to the invention.
Figure 8:
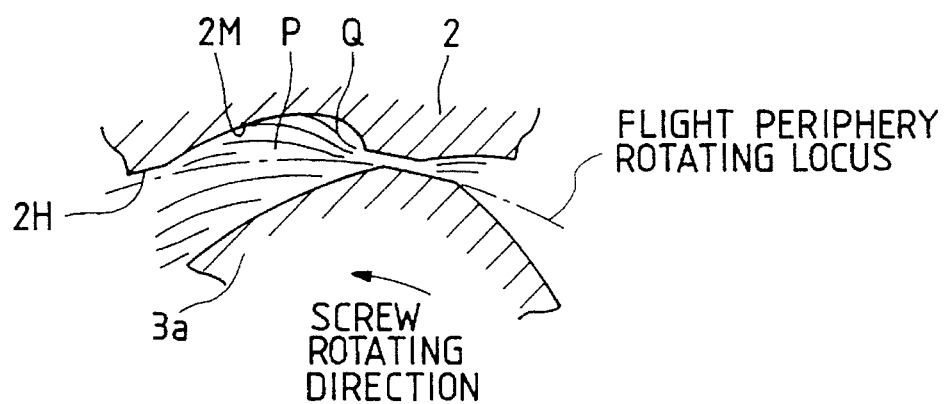
FIG. 8 is a sectional diagram for a description of the flow of a kneading material at each of the grooves of the cylinder in the twin extruder according to the invention.
Figure 9:
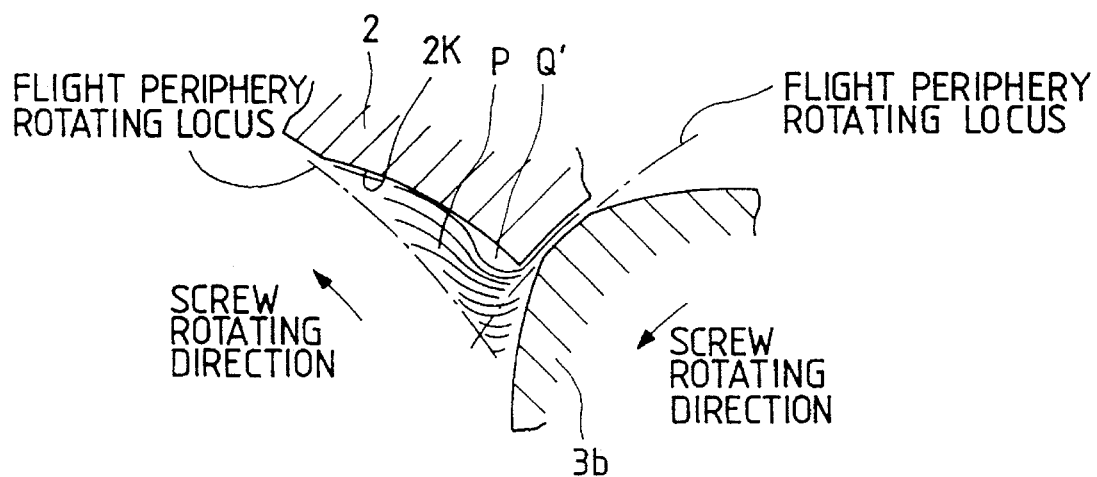
FIG. 9 is a sectional diagram for a description of the flow of a kneading material at each of the cuts of the cylinder in the twin extruder of the invention.

FIG. 1 is a diagram (or sectional plan view) showing the arrangement of a twin extruder according to the invention. FIGS. 2 through 5 are diagram showing examples of the cross section of a cylinder in the twin extruder according to the invention. FIG. 6 is an enlarged sectional diagram showing the configuration of grooves formed in the inner surface of the cylinder. FIG. 7 is an enlarged sectional diagram showing the configuration of cuts formed in the inner surface of the cylinder. FIG. 8 is a sectional diagram for a description of the flow of a kneading material in the groove. FIG. 9 is a sectional diagram for a description of the flow of a kneading material at the cut.

In FIG. 1, reference numeral 1 designates the twin extruder of the invention. The twin extruder 1 includes a cylinder 2, and two screws 3a and 3b which are rotatably engaged with each other in the internal hole 2H of the cylinder 2.

The twin extruder 1 has a material supplying section A, conveying sections B1 and B2, a kneading section C, a degassing section D and a discharging section E which are arranged in the stated order as viewed in the direction of conveyance of a kneading material P.

In correspondence to those sections A through E, the cylinder 2 comprises a material supplying cylinder 2a with a material supplying inlet 4, two conveying cylinders 2b1 and 2b2, a kneading cylinder 2c, a degassing cylinder 2d with a degassing outlet 5, and a discharging cylinder 2e.

Each of those cylinders 2a through 2e is equipped with a heating device and a cooling device (not shown) so that the temperature of the kneading material P is controlled suitably according to kneading conditions.

The two screws 3a and 3b are made up of full-flight screws 3F which are located in the material supplying section A, the conveying sections B1 and B2, the degassing section D and the discharging section E, and kneading disks 3D which are in the kneading section C. The two screws 3a and 3b are turned at the same speed by a drive unit (not shown) provided at the end of the material supplying cylinder 2a. In the twin extruder shown in FIG. 1, the screws are turned in the same direction; however, other screws may be employed which are turned in the opposite directions. It should be noted that the two screws 3a and 3b are made up of a number of screw pieces which can be freely replaced with one another so that the kneading conditions can be changed according to the kneading characteristic of a kneading material P.

Figure 2:
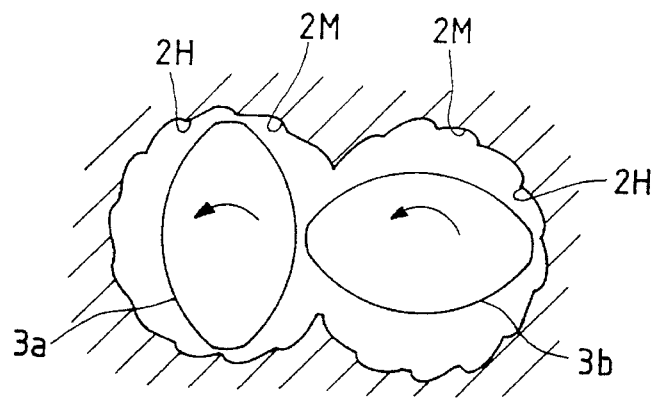
FIG. 2 is a cross-sectional view of a cylinder in one example of the twin extruder of the invention in which screws are turned in the same direction, showing the internal hole of the cylinder which has grooves.
Figure 3:
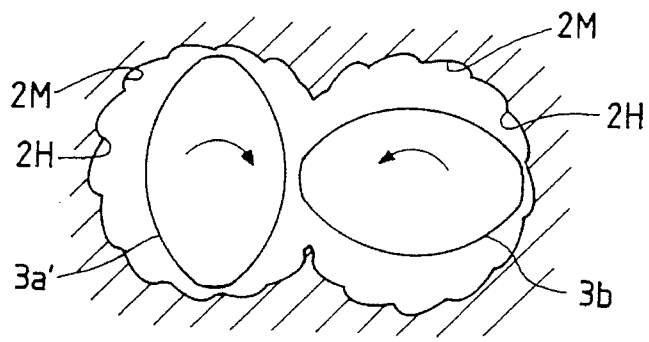
FIG. 3 is a cross-sectional view of a cylinder in another example of the twin extruder of the invention in which screws are turned in the opposite directions, showing the internal hole of the cylinder which has grooves.

A first embodiment of the invention is as shown in FIGS. 2 and 3. That is, in the case where the two screws 3a and 3b are turned in the same direction, the two conveying cylinders 2b1 and 2b2 and the kneading cylinder 2c are designed as shown in FIG. 2; and in the case where the two screws 3a and 3b are turned in the opposite direction, the screws 3a and 3b are designed as shown in FIG. 3. In both of the cases, a plurality of grooves 2M are formed in two walls arcuate in section of the cylinder 2 which define the internal hole 2H of the latter 2 (hereinafter referred to as "arcuate walls", when applicable) in such a manner that they are extended axially.

The formation of the grooves 2M increases the sectional area of the flow path in which the kneading material P is allowed to flow along the internal hole 2H while being rotated. Each of the grooves 2M is smoothly curved in such a manner that, in its section perpendicular to the axis, the distance between the bottom of the groove and the outer rotational periphery (flight periphery) of the screw 3a (or 3b) is gradually decreased in the direction of rotation of the screw 3a (or 3b).

FIG. 6 shows a typical sectional configuration of the grooves 2M. The sectional configuration of the bottom of each of the grooves 2M is formed by connecting an arc having a small radius of curvature R1 to an arc having a large radius of curvature R2 in the direction of rotation of the screw 3a (or 3b).

In the case of FIG. 6, the sectional configuration of the bottom of each of the grooves 2M is formed by connecting the arcs; however, the invention is not limited thereto or thereby. That is, it may be formed by smoothly connecting more than one straight line, or a straight line and a curved line including an arc, or curved lines.

A kneading material P which is a granular or powdery resin material more than 10% of which is powdery material 10 microns or less in average grain size, or a kneading material P which is a powdery resin material in its entirety is supplied through the material supplying inlet 4 of the material supplying cylinder 2a to the twin extruder 1 in which the screws 3a and 3b are kept rotated. The kneading material P thus supplied is conveyed down the internal hole 2H of the cylinder 2 (towards the downstream end of the cylinder 2) by the screws 3a and 3b while being turned along the two walls arcuate in cross section of the cylinder 2 which define the internal hole 2H of the latter 2.

In this operation, the kneading material P is externally heated by the heating means provided for the cylinder 2, while being subject to the kneading action of the screws 3a and 3b turning in the internal hole 2H of the cylinder 2 and to the friction produced in the kneading material P. As a result, the temperature of the resin material is increased, thus being molten.

The melting of the resin material starts at the border between the kneading section C and the conveying sections B1 and B2, namely, a material transfer region. Hence, downstream of the material transfer region, the kneading material P is kneaded being in a molten state.

The resin material thus molten; that is, the kneading material P is a fluid material high in viscosity, being low in deformation speed.

Hence, when the kneading material P thus molten flows along the internal hole 2H of the cylinder 2, as shown in FIG. 8, at the edge of the groove 2M it cannot immediately follow the abrupt enlargement in section of the flow path, so that a space Q is formed where the enlargement starts (hereinafter referred to as "an enlargement start line", when applicable). This space Q is formed along the enlargement start line of each groove 2M; that is, it is extended axially to the downstream end of the kneading cylinder 2c.

The particles of the powdery material hold gas (generally air) which is not readily allowed to come out of the kneading material. Hence, the gas together with the kneading material P is moved down the cylinder 2. In this operation, as the kneading material P is heated, the gas is increased in volume and accordingly in pressure.

The gas thus increased in pressure is readily allowed to come out of the kneading material P when it comes to the groove 2M where the flow path is increased in sectional area and the internal pressure is lowered. The gas is caused to flow through the space Q to a low pressure region, namely, the degassing cylinder 2d which is on the downstream side thereof, thus being discharged through the degassing outlet 5 out of the cylinder 2.

The grooves 2M are extended to the downstream end of the kneading cylinder 2c, but they are not formed in the degassing cylinder 2d. In this connection, it should be noted that the screws 3a and 3b in the kneading cylinder 2d are made up of the kneading disks 3D as was described above. Hence, negative pressure is formed in the spaces on the backs of the flights. Accordingly, the gas flowing through the spaces Q is readily allowed to flow through the spaces on the backs of the kneading disks 3D to the degassing cylinder 2d.

In the degassing section D, the grooves of the screws 3a and 3b are not fully filled with the kneading material P; that is, spaces are formed on the backs of the flights of the full-flight screws 3F. Therefore, the gas flowing from the kneading section C readily reaches the degassing outlet 5 through the spaces on the backs of the flights.

The molten material P which fills the grooves 2M except the spaces Q, is drawn by the adjacent kneading material P turned together with the screws 3a and 3b, and therefore it is readily moved out of the groove bottoms which are made gradually shallow and merge with the internal hole 2H, thus not being retained in the grooves 2M.

In other words, while being conveyed along the internal hole 2H of the cylinder 2 by the screws 3a and 3b, the kneading material P is caused to repeatedly go across the grooves 2M, the conveying sections B1 and B2 and the kneading section C, so that the gas is separated from the kneading material P. Briefly stated, the material P is kneaded while being degassed.

Figure 4:
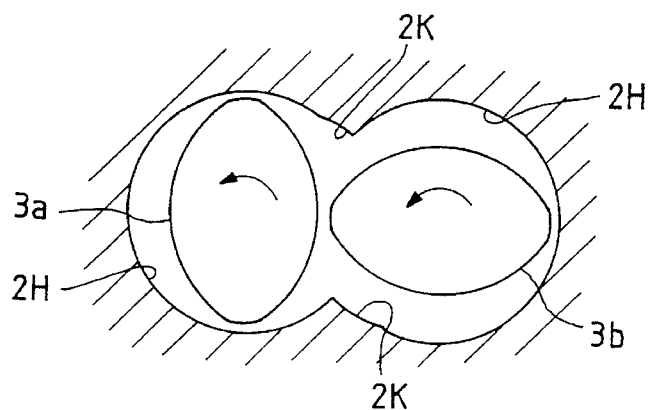
FIG. 4 is a cross-sectional view of a cylinder in another example of the twin extruder of the invention in which screws are turned in the same direction, showing the internal hole of the cylinder which has cuts.

In a second embodiment of the invention, the two screws 3a and 3b are turned in the same direction, and as shown in FIG. 4, the conveying cylinders 2b1 and 2b2 and the kneading cylinder 2c have two cuts 2K at the junctions of the two arcuate walls of the cylinder 2 which define the internal hole 2H, in such a manner that the cuts 2K are continuously extended axially of the cylinder 2.

The formation of the cuts 2K in this manner increases the sectional area of the flow path in the direction of flow of the kneading material P which is conveyed down the internal hole 2H while being turned. Each of the cuts 2K is so shaped that, in its sectional configuration, the distance between the bottom of the cut and the outer rotational periphery (or flight periphery) of the screw 3a (or 3b) is gradually decreased in the direction of rotation of the screw 3a (or 3b). In other words, each of the cuts 2K is smoothly curved or made linear in sectional configuration so that the distance between the bottom of the cut 2K and the outer rotational periphery of the screw 3a or 3b is gradually decreased which is turned along the arcuate wall while approaching the junction of the arcs from the space in the internal hole 2H.

FIG. 7 shows a typical example of the cuts 2K. In the typical example, the sectional configuration of the cut 2K is determined by one radius of curvature R3; however, the invention is not limited thereto or thereby. That is, it may be formed by smoothly connecting more than one curved line or it may be of a straight line.

In the twin extruder 1 in which the screws 3a and 3b are turned in the same direction, the kneading material P including a powdery material supplied through the material supplying inlet 4 of the material supplying cylinder 2a is molten and kneaded similarly as in the case of the above-described first embodiment.

The kneading material P thus molten is caused to move down the internal hole 2H of the cylinder 2. When, in the internal hole 2H, the kneading material P moving along the arcuate wall comes to the cut 2K at the junction of the arcuate walls, it cannot follow the abrupt enlargement in sectional area of the flow path so that, as shown in FIG. 9, a space Q' is formed where the enlargement starts.

The space Q' is extended axially along the starting edge of each cut 2K to the downstream end of the kneading cylinder 2c.

Similarly as in the case of the first embodiment, the gas in the kneading material P is allowed to flow through the spaces Q' and to be discharged from the discharging outlet 5 of the degassing cylinder 2d out of the cylinder 2.

The kneading material P which fills the cuts 2K except the spaces Q' is caused to move from the cuts 2K similarly as in the case of the first embodiment; that is, it will not be held there.

In other words, the kneading material P is conveyed down the internal hole 2H of the cylinder 2 by the screws 3a and 3b while being turned. In this operation, the kneading material P is caused to repeatedly go across the cuts 2K in the kneading section C, so that the gas is separated from the kneading material P; that is, the latter P is kneaded while being degassed.

Figure 5:
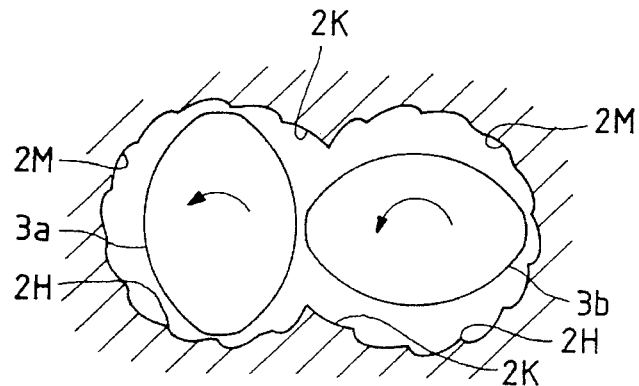
FIG. 5 is a cross-sectional view of a cylinder in another example of the twin extruder of the invention in which screws are turned in the same direction, showing the internal hole of the cylinder which has grooves and cuts.

FIG. 5 shows a third embodiment of the invention. In the twin extruder 1 in which the two screws 3a and 3b are turned in the same direction, the conveying cylinders 2b1 and 2b2 and the kneading cylinder 2c have the above-described grooves 2M of the first embodiment, and the cuts 2K of the second embodiment.

In the twin extruder thus constructed, the grooves 2M function in the same manner as those in the first embodiment and the cuts 2K also function in the same manner as those in the second embodiment.

In the above-described embodiment, the internal hole 2H of the cylinder 2 has the plurality of grooves 2M or two cuts 2K. Hence, for the kneading material P which is moved down the internal hole 2H while being turned, the sectional area of the flow path is variable being repeatedly increased and decreased, so that the kneading material P is partially shifted in many directions. Thus, the material P is sufficiently kneaded and dispersed; that is, it is uniformly kneaded.

At the enlarged parts of the sectional area of the flow path, the shearing force in the kneading material P is decreased, which suppresses the raise of temperature of the kneading material P. Thus, the kneading material P is prevented from being excessively increased in temperature.

A border section is provided between the material supplying cylinder 2a and the conveying cylinder 2b1, and another border section is provided between the kneading cylinder 2c and the degassing cylinder 2d. Each of those border sections has a sectional configuration transition region where the cross-sectional configuration of the inner hole 2H merges smoothly with those of the grooves 2M or the cuts 2K.

Owing to the provision of the sectional configuration transition regions, the inner hole 2H has no corner, which prevents the retention of the kneading material P therein.

Experiments

Experiments on the twin extruder of the invention were carried out. The results of the experiments are indicated in the following Table 1:

1. Apparatus used for the experiments

Twin extruder TEX 44-31.5AW-2V (manufactured by JSW Co., Ltd.)
Cylinder inside diameter=44 mm
Cylinder length=1386 mm {(cylinder length)/(cylinder inside diameter)=31.5}

In order to achieve the degassing operation and the kneading operation with high efficiency, the twin extruder has two kneading sections C, and two degassing sections D. That is, in the twin extruder, the material supplying section A, the conveying sections B1 and B2, the kneading section C, the degassing section D, the conveying section B2, the kneading section C, the degassing section D, and the discharging section E are arranged in the stated order in the direction of conveyance of a kneading material.

In the conveying sections B1 and B2 and the kneading sections C, the internal hole 2H of the cylinder 2 has four grooves 2M in the arcuate walls. The two screws are turned in the same direction.

TABLE 1

| Experiment No. | Cylinder configuration | Non-organic filler mixture percentage (wt %) | Screw speed (RPM) | Discharge capacity (Kg/H) | Discharge temperature (°C.) | Consumed energy (KW H/Kg |
|---|---|---|---|---|---|---|
| 1 | conventional configuration | 20 | 250 | 50 | 212 | 0.166 |
| 2 | " | 20 | 450 | 70 | 228 | 0.205 |
| 3 | " | 40 | 250 | 20 | 210 | 0.234 |
| 4 | " | 40 | 450 | 20 | 230 | 0.350 |
| 5 | With grooves | 40 | 250 | 33 | 207 | 0.185 |
| 6 | " | 40 | 450 | 46 | 228 | 0.198 |
| 7 | With cuts | 40 | 250 | 26 | 206 | 0.183 |
| 8 | " | 40 | 450 | 34 | 229 | 0.220 |
| 9 | With grooves and cuts | 20 | 250 | 90 | 210 | 0.143 |
| 10 | " | 20 | 450 | 140 | 225 | 0.160 |
| 11 | " | 40 | 250 | 40 | 205 | 0.163 |
| 12 | " | 40 | 450 | 60 | 228 | 0.198 |

2. Kneading material
Polypropylene pellets Melt index=8
Talc (non-organic filler)
Average grain size=2–3 μm The raw materials were supplied through their own supplying means to the twin extruder.

The twin extruder of the invention designed as described above has the following effects or merits:

(1) In the conveying section and the kneading section, the internal hole of the cylinder has the grooves and/or the cuts which are extended axially. Hence, the gas held by the material being kneaded is allowed to flow through the spaces formed along the grooves and/or the cuts to the degassing section. Thus, the gas is readily separated from the kneading material and discharged from the extruder.

(2) The gas contained in the material being kneaded is never moved back towards the upstream end of the cylinder, and the kneading material is therefore stably supplied, which greatly improves the processing (discharging) capacity of the extruder.

(3) In the twin extruder, its steady operation is carried out stably, and the uneconomical consumption of energy is eliminated.

(4) In the twin extruder, the kneading material is caused to repeatedly move across the grooves and/or the cuts; that is, the cross-sectional area of the flow path for the kneading material is variable for the kneading material being repeatedly increased and decreased. Hence, the material is kneaded with high efficiency; that is, it is uniformly kneaded. In addition, the raise of temperature of the kneading material is suppressed, and the consumption of energy is decreased as much.

What is claimed is:

1. A twin extruder comprising:

a cylinder provided with a material supplying section, a conveying section, a kneading section, a degassing section, and a discharging section, said cylinder having an internal hole therein;

a pair of screws rotatably engaged with each other in the internal hole of the cylinder; and a plurality of grooves formed in two walls arcuate in cross section of said cylinder which defines said internal hole in said conveying section and said kneading section in such a manner that said grooves are continuously extended axially, wherein a distance between each of said grooves and an outer rotational periphery of the respective one of said screws is gradually decreased in the direction of rotation thereof.

2. A twin extruder comprising:

a cylinder provided with a material supplying section, a conveying section, a kneading section, a degassing section, and a discharging section, said cylinder having a pair of holes therein extending in an axial direction in a side-by-side relationship which communicate with one another, said holes being defined by respective internal surfaces which intersect one another along a pair of axially extending ridges;

a pair of screws rotatably disposed in said pair of holes, respectively, wherein at least one groove is provided in each of said respective internal surfaces, each said at least one groove extending substantially in said axial direction and defining a gas relief space through which gas released from the kneaded material flows to said degassing section.

3. The twin extruder of claim 2, wherein each said at least one groove has an arcuate cross-section.

4. The twin extruder of claim 2, wherein each said at least one groove has a linear cross-section.

5. The twin extruder of claim 4, wherein each said at least one groove is provided immediately adjacent an associated one of said ridges.

6. The twin extruder of claim 2, wherein each of said internal surfaces has a plurality of said grooves.

7. The twin extruder of claim 6, wherein some of said grooves have an arcuate cross-section and one of said grooves has a linear cross-section.

8. The twin extruder of claim 2, wherein said screws rotate in opposite directions.

9. The twin extruder of claim 2, wherein said screws rotate in the same direction.

10. The twin extruder of claim 2, wherein a distance between a bottom surface of each said at least one groove and an outer rotational periphery of the respective one of said screws is gradually decreased in the direction of rotation thereof.

11. The twin extruder of claim 10, wherein each said at least one groove has an arcuate cross-section.

12. The twin extruder of claim 10, wherein each said at least one groove has a linear cross-section.

13. The twin extruder of claim 10, wherein each of said internal surfaces has a plurality of said grooves.

14. The twin extruder of claim 13, wherein some of said grooves have an arcuate cross-section and one of said grooves has a linear cross-section.

15. The twin extruder of claim 10, wherein each said at least one groove is provided immediately adjacent an associated one of said ridges.

* * * * *